Dec. 22, 1931.        J. L. COLLINS        1,837,409
FRICTION CLUTCH
Filed April 15, 1929
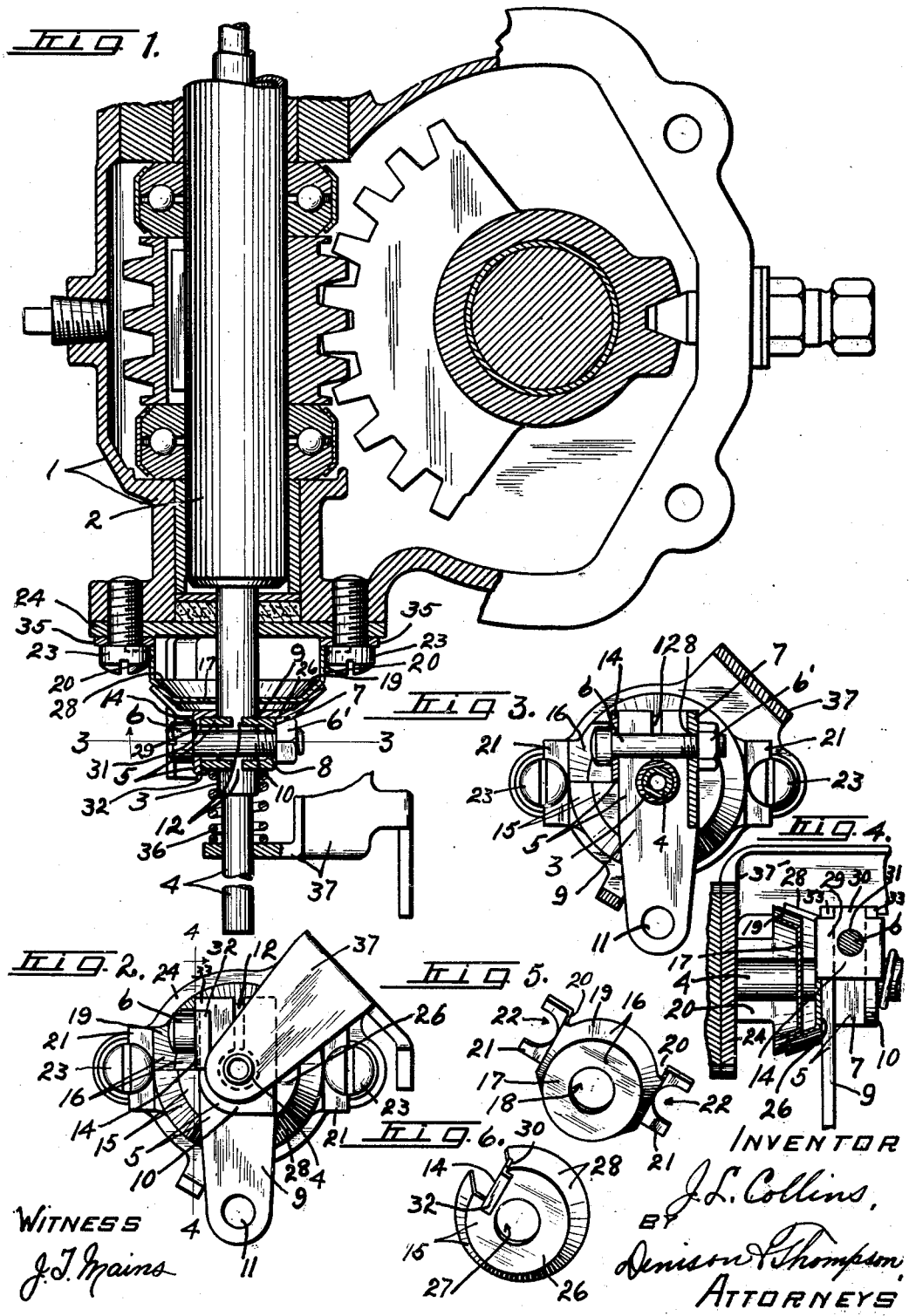

Patented Dec. 22, 1931

1,837,409

UNITED STATES PATENT OFFICE

JOHN L. COLLINS, OF SYRACUSE, NEW YORK, ASSIGNOR TO THE WARNER CORPORATION, OF SYRACUSE, NEW YORK, A CORPORATION OF INDIANA

FRICTION CLUTCH

Application filed April 15, 1929. Serial No. 355,372.

This invention relates to a new and improved friction clutch for control levers used in automobiles or other machines.

In the operation of engines used in automobiles, motor boats, and the like, where the operator is positioned at a distance from the engine, it is evident that some means must be provided for properly controlling the operation of said engine and this is usually accomplished through the medium of suitable rods and levers connected with the carburetor or distributor and which may be actuated in one direction by the action of a retracting spring.

In this event it is desirable and often necessary to provide some means for maintaining the control levers in the adjusted position against vibratory movement or the action of a retracting spring, etc.

The main object of my invention, therefore, is to construct a friction clutch which will maintain the control levers in the adjusted position, be easily and readily assembled and dis-assembled, and be produced at a very low cost.

Other objects and advantages relate to the size, form and relation of the parts thereof, all as will more fully appear from the following description taken in connection with the accompanying drawings, in which:—

Figure 1 is a longitudinal section through the lower end of a steering gear assembly with my device in operative position.

Figure 2 is a plan view of the lower end of the steering gear as shown in Figure 1.

Figure 3 is a section taken in the plane of the line 3—3, Figure 1.

Figure 4 is a detailed section taken on line 4—4, Figure 2.

Figures 5 and 6 are perspective views of the respective friction cones.

Referring to Figure 1 of the drawings, I have shown a portion of the lower end of a steering gear which consists of the usual gear case —1— in which is journaled one end of a steering post —2— having the usual control rods or tubes —3— and —4— fulcrumed therein, and mounted one within the other. The control tubes —3— and —4— may each be manually operated in any convenient manner, as through the medium of suitable levers (not shown) secured to the upper end of the respective tubes in close relation to the steering wheel.

As illustrated, the tubes —3— and —4— extend in the usual manner beyond the lower end of the case —1— and in this instance have a lever —5— adjustably secured to the outer tube —3— near the end thereof by a clamping bolt —6— and nut 6' screw-threaded thereon. The lever —5— may be of any desired construction, or as shown, may be constructed of sheet metal formed with a body portion —7— provided with an aperture —8— positioned near the outer edge thereof and adapted to receive the clamping bolt —6—.

The body —7— is provided with up-turned sides —9— and —10— to produce a U-shaped unit with one side, as —9—, extended to form an arm which is provided with an aperture —11— near its outer end adapted to receive one end of a link connection suitable for connecting the lever to the control lever of the carburetor. The side members —9— and —10— are each provided with an aperture in cooperative alignment and in a plane ahead of the aperture in the body —7— provided for the clamping bolt adapted to receive the control tube —3— therein.

A longitudinal slot as —12— is provided in each of the side members and extends from the aperture to the edge of the respective side at which the clamping bolt aperture is located so that any clamping effect exerted by the screw —6— will produce a corresponding gripping of the side members on the control tube —3—.

It is necessary in this construction of the lever to provide some means which may be positioned across the outer edge of the up-turned sides —9— and —10— for preventing any relative movement of said sides, as a stress is placed thereon through the action of the clamping bolt —6— as the nut 6' is screw-threaded thereon, and also to act as a support for the head of said bolt.

For this reason I have provided a clip as —14— which may be formed from a portion of one of the frictional members and support same in the operative position when assembled, and also cause it to rotate with the lever —5—.

The friction-producing means in this instance consists of two conical members 15 and 16. The friction cone member 16 is constructed with a substantially flat base-plate 17 circular in plan view and provided with a perforation 18 in the center thereof adapted to receive the control tube —3—.

The base 17 is also provided with an outwardly tapered or conical rim 19 which has a plurality of in this instance two diametrically opposed forwardly extending parallel legs 20 which have their outer ends bent outwardly to form feet portions 21. The feet 21 are each provided with a substantially semi-circular opening —22— adapted to receive a head of respective screws 23 which are used to clamp the usual cover-plate —24— to the case —1—.

The friction cone member 15 is constructed similarly to the cone member —16— and consists of a flat circular base-plate —26— provided with a perforation —27— adapted to receive the control tube —3— therethrough, and also has an outwardly tapered or conical rim —28— similar to the rim —19—. A portion of the rim —28— and plate —26— may be slotted from the outer edge inwardly to form a strip of metal of the desired shape so that when it is bent outwardly at an angle to the outer face of the base-plate —26— it will form the clip —14—.

The clip consists of a major or body portion —29— having a spacing lug —30— projecting from one side thereof of a width substantially equal to the distance between the sides —9— and —10— of the lever —5—. An aperture —31— is centrally located in the body —29— which is adapted to receive clamping bolt —6—. The body portion —29— also has its outer end bent at an angle thereto to form a depending side —32— adapted to engage the outer surface of the side —10—.

It is now evident that when the friction cone —15— with the clip —14— and the lever —5— are assembled upon the control tube —3— with the sides —9— and —10— positioned between the base —26— and the side —32— of the clip respectively in close relation thereto and with the spacing lug —30— between upstanding shoulders —33— provided on the outer edge of the sides —9— and —10—, that when a stress is produced upon the slotted side of the lever —5— by screw-threading the nut 6' on the bolt —6— it will secure the lever and friction cone 15 together, clamp the lever to the tube —3— and secure the sides —9— and —10— against relative movement.

When the friction cone —16— is in operative position on the control tube —3— it will be located between the friction cone —15— and the cover-plate —24— with the feet —21— in contact with respective washers —35— provided for the screws —23— and with the head of said screws registering in respective apertures —22—, thereby preventing the friction cone —16— from rotating when in contact with the friction cone 15.

The cone member 16 may be held in its operative position and with the outer face of the conical rim 19 in frictional contact with the inner face of the conical rim —28— of the member 15 by a tensional spring —36— mounted on the tubes —3— and —4— between the lever —5— and a U-shaped arm —37— having one end mounted on the tube —4— in spaced relation to the lever —5— and the other end secured to or integral with the cover-plate —24—.

By having the spring —36— of the proper tension sufficient friction will be produced between the friction cones —15— and —16— to hold the control lever —5— and associated members in the set position against vibratory movement or the action of a retracting spring as hereinbefore mentioned, and at the same time permitting the manual manipulation of the control means to operate the engine as desired.

Altho I have shown and particularly described a preferred embodiment of my invention, I do not wish to be limited to the exact details of construction shown, as various changes may readily be made without departing from the spirit of this invention as set forth in the appended claims.

I claim:

1. In a device of the class described, a retaining means, a stationary clutch member comprising a base-plate provided with a conical rim, a plurality of forwardly projecting spaced legs extending from the outer edge of the rim and having the outer ends thereof provided with lateral flanges adapted to engage the retaining means, a rotating clutch member comprising a base-plate provided with a conical rim adapted to frictionally engage the rim of the stationary clutch member, means connected with the second clutch member for rotation thereof, and means for maintaining said rims in frictional contact.

2. In a device of the class described, a supporting means, a clutch member normally positioned on the supporting means comprising a base-plate provided with a conical rim, a plurality of forwardly projecting spaced legs extending from the outer edge of the rim and having the outer ends thereof provided with lateral flanges which are provided with an aperture adapted to engage a portion of the supporting means to hold said clutch against relative movement, a movable clutch member comprising a base-plate provided with a conical rim, a clip formed from a portion of the rim and base-plate and bent at an angle to one face of the base-plate, an aperture provided in the up-turned portion of the clip adapted to receive a clamping bolt, and one edge of said clip bent upon its self and another edge extended to form a spacing lug, a means for yieldingly maintaining said rims in frictional contact and for holding the stationary clutch in its normal position against the supporting means, and means connected with the clip for rotating the movable clutch.

3. In an apparatus of the class described, the combination with a steering gear housing of a steering column mounted in the housing, a tube extending through the steering column, a clutch member surrounding the tube and secured to the housing, a second clutch member surrounding the shaft and adapted to engage the first-named clutch member, a lever mounted on the tube and having an open side, and a clip formed from a portion of the second-named clutch member extending across the open side of the lever.

4. In an apparatus of the class described, the combination with a steering gear housing and a steering column mounted in said housing, of a tube extending through the steering column and housing, a clutch member surrounding the tube and having outwardly projecting legs adapted to removably engage the housing, a lever clamped to the tube, a second clutch member secured to the lever and adapted to engage the first named clutch member, and a spring supported by the housing and engaging said lever for yieldingly maintaining said clutch members in frictional contact.

5. In an apparatus of the class described, the combination with a steering gear housing and a steering column mounted in said housing, of a tube extending through the steering column and housing, a clutch member surrounding said tube and adapted to be secured against relative movement and in spaced relation to said housing, a second clutch member adapted to frictionally engage the first-mentioned member and provided with an outwardly projecting clip, a lever mounted on said tube, and means connecting the clip with said lever adapted to secure the lever to the tube to rotate therewith.

6. In a device as set forth in claim 5, a spring supported by the housing and engaging said lever to maintain the clutch members in frictional contact.

In witness whereof I have hereunto set my hand this 8 day of April, 1929.

JOHN L. COLLINS.